US011189320B2

(12) United States Patent
Nir et al.

(10) Patent No.: US 11,189,320 B2
(45) Date of Patent: *Nov. 30, 2021

(54) SYSTEM AND METHODS FOR CONCATENATING VIDEO SEQUENCES USING FACE DETECTION

(71) Applicant: Fusit, Inc., Santa Monica, CA (US)

(72) Inventors: Michal Shafir Nir, Tel Aviv (IL); Liat Sade-Sternberg, Pacific Palisades, CA (US); Rhona Horiner Rosen, Haifa (IL); Tamar Raviv, Burgata (IL)

(73) Assignee: FUSIT, INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,562

(22) Filed: Jul. 21, 2020

(65) Prior Publication Data

US 2020/0349978 A1    Nov. 5, 2020

Related U.S. Application Data

(63) Continuation of application No. 15/897,270, filed on Feb. 15, 2018, now Pat. No. 10,734,027.

(Continued)

(51) Int. Cl.
*H04N 21/854* (2011.01)
*G11B 27/036* (2006.01)
(Continued)

(52) U.S. Cl.
CPC ........ *G11B 27/036* (2013.01); *G06K 9/00228* (2013.01); *G06K 9/00765* (2013.01);
(Continued)

(58) Field of Classification Search
None
See application file for complete search history.

(56) References Cited

U.S. PATENT DOCUMENTS 8,515,254 B2    8/2013  Kikuchi
10,734,027 B2*  8/2020  Nir .................... H04N 21/2365
(Continued)

*Primary Examiner* — Eileen M Adams
(74) *Attorney, Agent, or Firm* — Browdy and Neimark, PLLC

(57) ABSTRACT

There are provided methods and devices for media processing, comprising: providing at least one media asset source selected from a media asset sources library, the at least one media asset source comprising at least one source video, via a network or client device; receiving via the network or the client device a media recording comprising a client video recorded by a user of the client device; parsing the client video and the source video, respectively, to a plurality of client video frames and a plurality of source video frames; identifying at least one face in at least one frame of the plurality of source video frames and at least another face in at least one frame of the plurality of client video frames by face detection; superposing one or more markers on the identified at least one face of the plurality of source video frames; processing said client video frames to fit the size or shape of said source video frames by using said one or more markers; concatenating said processed client video frames with said source video frames, wherein said concatenation comprises matching the frame rate and resolution of the processed client video frames to the frame rate and resolution of the plurality of client video frames to yield a mixed media asset.

13 Claims, 7 Drawing Sheets

Related U.S. Application Data

(60) Provisional application No. 62/459,620, filed on Feb. 16, 2017.

(51) Int. Cl.

| | | |
|---|---|---|
| *G06K 9/00* | (2006.01) | |
| *H04N 21/472* | (2011.01) | |
| *H04N 21/4402* | (2011.01) | |
| *H04N 21/2365* | (2011.01) | |
| *H04N 21/44* | (2011.01) | |
| *H04N 21/234* | (2011.01) | |
| *H04N 21/4788* | (2011.01) | |
| *G11B 27/28* | (2006.01) | |
| *H04N 21/2343* | (2011.01) | |
| *G11B 27/031* | (2006.01) | |
| *H04N 21/2665* | (2011.01) | |

(52) U.S. Cl.
CPC ............ *G11B 27/031* (2013.01); *G11B 27/28* (2013.01); *H04N 21/2365* (2013.01); *H04N 21/23418* (2013.01); *H04N 21/23424* (2013.01); *H04N 21/234363* (2013.01); *H04N 21/234381* (2013.01); *H04N 21/2665* (2013.01); *H04N 21/44008* (2013.01); *H04N 21/440263* (2013.01); *H04N 21/440281* (2013.01); *H04N 21/4788* (2013.01); *H04N 21/47205* (2013.01); *H04N 21/854* (2013.01)

(56) References Cited

U.S. PATENT DOCUMENTS

| | | | |
|---|---|---|---|
| 2012/0154684 A1* | 6/2012 | Luo | G11B 27/28 348/700 |
| 2013/0093923 A1* | 4/2013 | Imagawa | H04N 9/04555 348/239 |
| 2014/0028662 A1 | 1/2014 | Liao et al. | |
| 2014/0176803 A1 | 6/2014 | Luo et al. | |
| 2017/0264934 A1* | 9/2017 | Guo | H04N 21/8547 |
| 2018/0114546 A1 | 4/2018 | Singhal et al. | |

* cited by examiner

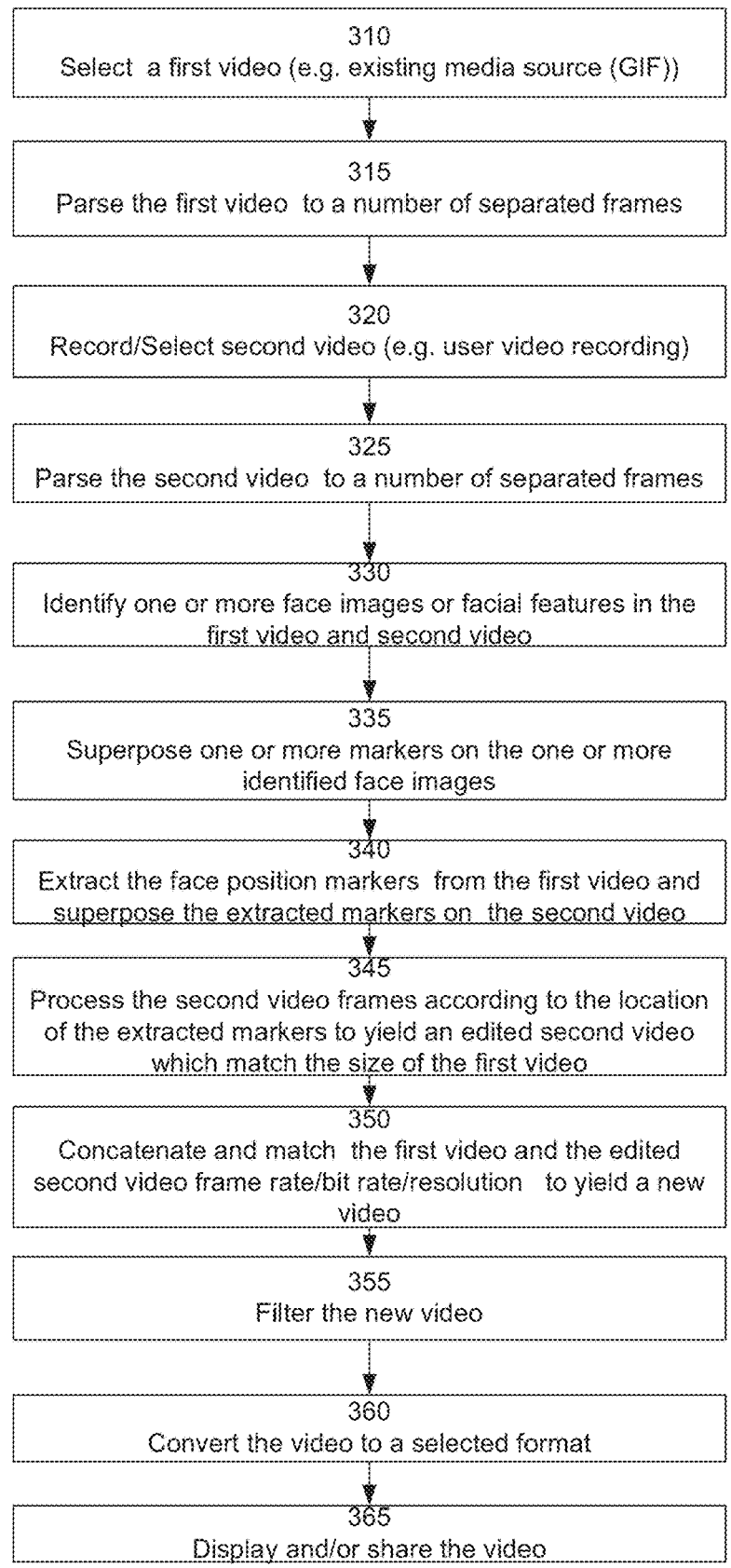

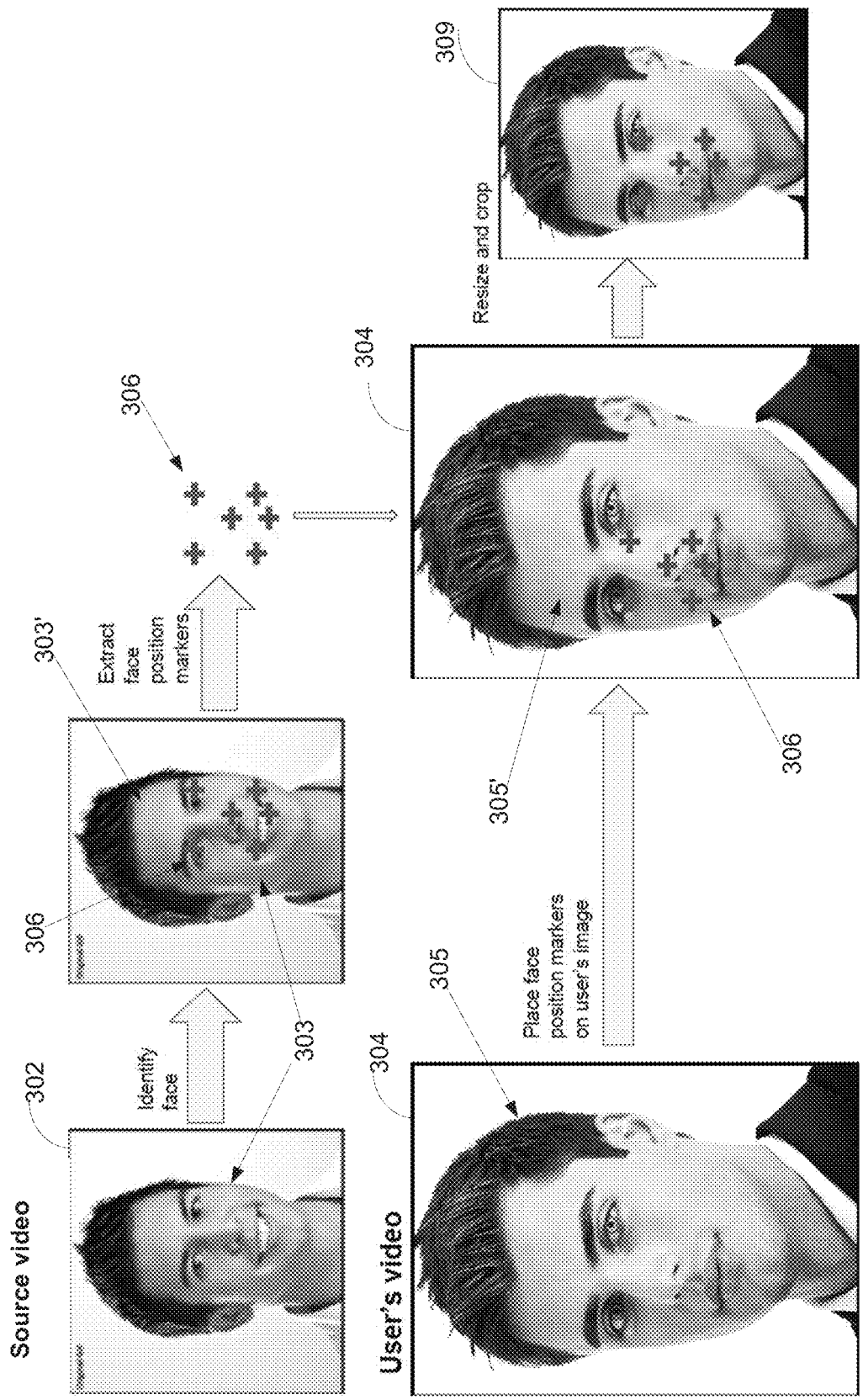

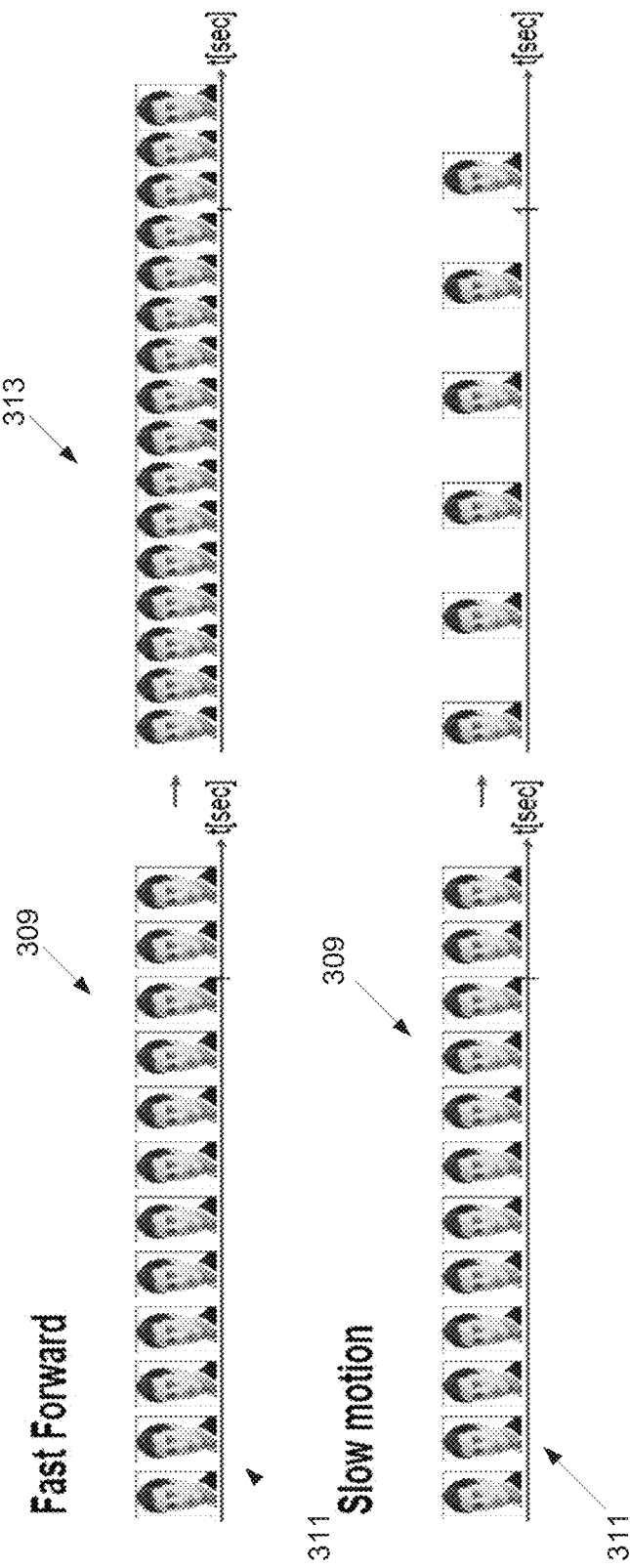

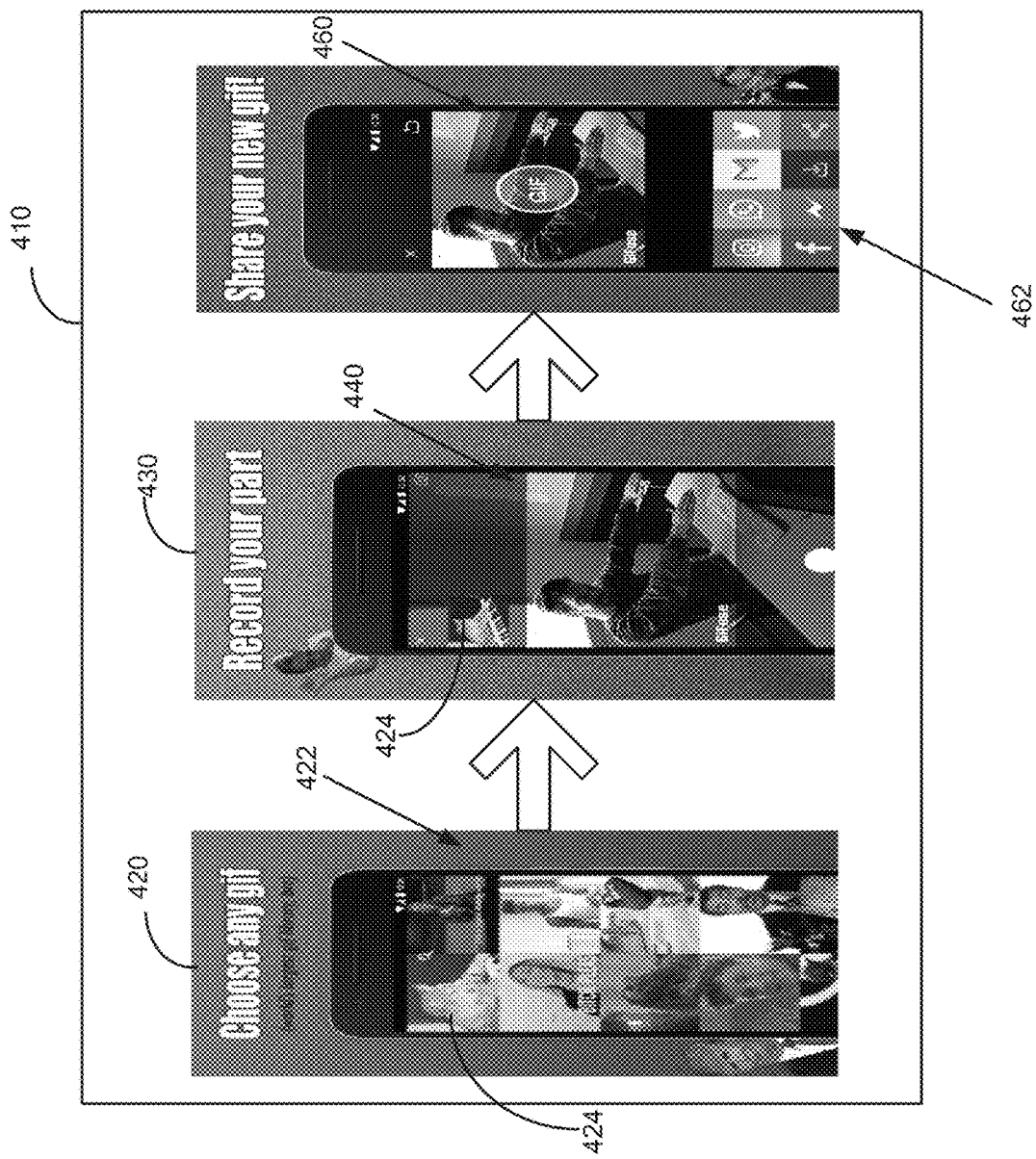

SYSTEM AND METHODS FOR CONCATENATING VIDEO SEQUENCES USING FACE DETECTION

CROSS-REFERENCE

The present application claims the benefit of U.S. Provisional Application Ser. No. 62/459,620 filed on Feb. 16, 2017, entitled "CONCATENATING VIDEO SEQUENCES USING FACE RECOGNITION", the entire disclosures of which are incorporated herein by reference.

FIELD OF THE INVENTION

The present invention relates generally to media processing, and particularly to automatically editing and concatenating of video streams from different sources.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Social mobile video platforms and live-streaming options on online video platforms including for example YouTube, Instagram, Snapchat and social media sites such as Facebook are still growing in popularity. Accordingly, various applications and systems for digital graphic design, image editing, audio editing, video mixing and video editing known in the art, provide social platforms users with tools to create a variety of media contents.

The above mentioned video mixing and editing applications can be less than ideal in at least some respects. Prior video editing applications are time consuming and require professional editing skills as typically the image mixing and blending, filter adding and image manipulation are all manually performed. For example, in cases where a number of media contents such as videos from different sources are combined to a single movie file, the editing process requires manually editing numerous videos, or video sequences into a timeline. A layman editor (e.g. social media user) will then find it difficult and time-consuming to figure out how the videos should be combined, aligned or trimmed. Furthermore, any further change in the combined video will require additional video synchronization steps in the editing process. The layman editor will then be hesitant to make additional changes to the video sources as this will require making multiple corrections in multiple places. As a result, the uploaded combined video will be unprofessional with a low chance to increase the number of the combined video views.

SUMMARY OF THE INVENTION

According to a first aspect of some embodiments there is provided a method for media processing, comprising: providing at least one media asset source selected from a media asset sources library, the at least one media asset source comprising at least one source video, via a network or client device; receiving via the network or the client device a media recording comprising a client video recorded by a user of the client device; parsing the client video and the source video, respectively, to a plurality of client video frames and a plurality of source video frames; identifying at least one face in at least one frame of the plurality of source video frames and at least another face in at least one frame of the plurality of client video frames by face detection; superposing one or more markers on the identified at least one face of the plurality of source video frames; processing said client video frames to fit the size or shape of said source video frames by using said one or more markers; concatenating said processed client video frames with said source video frames, wherein said concatenation comprises matching the frame rate and resolution of the processed client video frames to the frame rate and resolution of the plurality of client video frames to yield a mixed media asset.

In some embodiments, the processing comprises: extracting said one or more markers from said at least identified one face image and superposing the extracted one or more markers on the other at least one identified face; and resizing the other at least one identified face to match the size or shape of the at least one identified face in the at least one frame of the plurality of source video frames.

In some embodiments, the processing further comprises cropping or scaling the at least one other identified face in the user video frames to match the size or shape of said identified at least one face image in the source video frames.

In some embodiments, the processing comprises: filtering the processed client video frames.

In some embodiments, the processing comprises: filtering the source video frames.

In some embodiments, the filtering comprises matching one or more of a bit rate or frame rate or resolution of the client video frames to the source video frames or vice versa.

In some embodiments, the filtering comprises one or more of the following filtering procedures: fast forward filtering; slow motion filtering; color filtering; black and white filtering.

In some embodiments, the face detection comprise identifying the position of one or more face elements in at least one frame of the plurality of video source frames and other one or more face elements in the at least one client video frames; and resizing the other at least one identified face elements in the at least one client video frames to match the size and shape of the at least one identified face elements in the at least one frame of the plurality of source video frames.

In some embodiments, the face detection comprises superposing one or more markers on the identified one or more face elements in the at least one frame of the plurality of video source frames.

In some embodiments, the media asset source is in a form selected from the group consisting of: graphics interchange format (GIF); or MP4; VP8; m4v; mov; avi; fav; mpg; wmv; h265.

In some embodiments, the face detection are selected from the group consisting of:
  a. SMQT Features and SNOW Classifier Method (SFSC)
  b. Efficient and Rank Deficient Face Detection Method (ERDFD)
  c. Gabor-Feature Extraction and Neural Network Method (GFENN)
  d. An efficient face candidates selector Features Method (EFCSF)

According to a second aspect of some embodiments there is provided an apparatus for media processing, compressing: a memory which is configured to hold one or more source media videos; and a processor which is configured to: transmit the one or more source media videos to a client device; to receive via the network or the client device a media recording comprising a client video recorded by a user of the client device; parse the client video and the source video, respectively, to a plurality of client video frames and a plurality of source video frames; identify at least one face in at least one frame of the plurality of source video frames and at least another face in at least one frame of the plurality of client video frames by face detection position; superpose one or more markers on the identified at least one face image of the plurality of source video frames; process said client video frames to fit the size or shape of said source video frames by using said one or more markers; concatenate said processed client video frames with said source video frames, wherein said concatenation comprises matching the frame rate and the resolution of the processed client video frames to the frame rate and the resolution of the plurality of client video frames to generate a mixed media asset.

According to a third aspect of some embodiments there is provided a computer software product, comprising a non-transitory computer-readable medium in which program instructions are stored, which instructions, when read by a computer, cause the computer to provide at least one media asset source selected from a media asset sources library, the at least one media asset source comprising at least one source video, via a network to a client device; receive via the network from the client device a media recording comprising a client video recorded by a user of the client device; parse the client video and the source video, respectively, to a plurality of client video frames and a plurality of source video frames; identify at least one face in at least one frame of the plurality of source video frames and at least another face in at least one frame of the plurality of client video frames by face detection position; superpose one or more markers on the identified at least one face image of the plurality of source video frames; process said client video frames to fit the size or shape of said source video frames by using said one or more markers; and concatenate said processed client video frames with said source video frames wherein said concatenation comprises matching the frame rate and the resolution of the processed client video frames to the frame rate and the resolution of the plurality of client video frames to generate a mixed media asset.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIG. 3A shows a flow chart of a method for concatenating a first video with a second video using face detection methods to form a new coherent, seamless and synchronized video, in accordance with embodiments;

FIGS. 3B-3D show an example of a method for concatenating a first video with a second video using face detection methods, in accordance with embodiments; and FIG. 4 is a schematic representation of a user interface screen, in accordance with embodiments.

Figure 1:
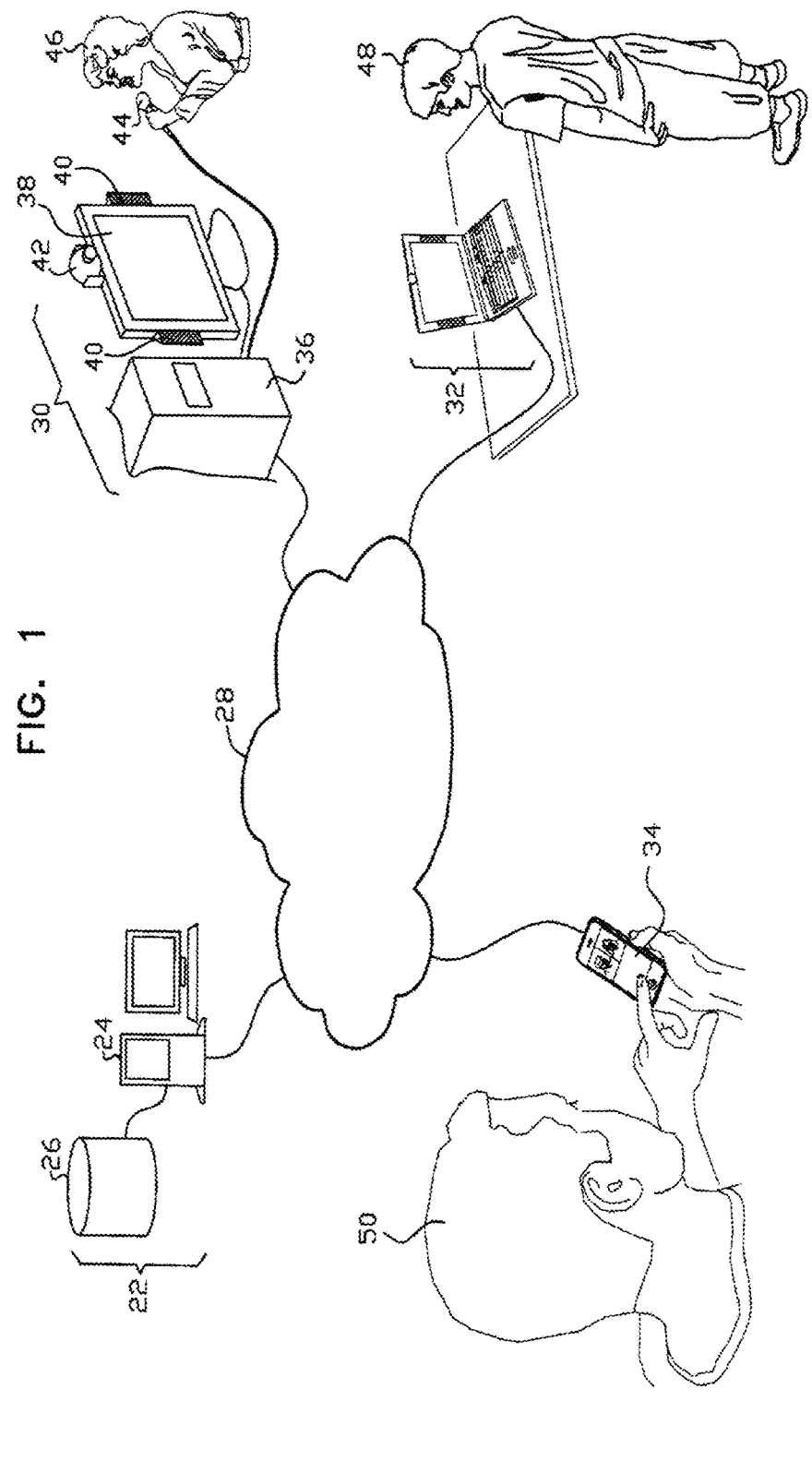
FIG. 1 is a schematic diagram of automatic real-time video creator and distribution system, in accordance with embodiments.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figure and described in the specification, but only as indicated in the accompanying claims, with the proper scope determined only by the broadest interpretation of said claims.

DETAILED DESCRIPTION OF THE INVENTION

Prior to setting forth the detailed description of the invention, it may be helpful to set forth definitions of certain terms that will be used hereinafter.

The term 'media asset source' or 'existing media asset source' as used herein and through the specification and claims should be understood to encompass a video such as an existing video which the user wishes to mix (e.g. concatenate) with his media recording such as video recording. A media asset source may be or may include a media clip which is a short version of a media asset.

The term 'mixed media asset' as used herein and through the specification and claims should be understood to encompass a media asset source mixed or concatenated with the user media recording.

The term 'face detection' or 'face detecting' as used herein and through the specification and claims should be understood to encompass a method or device that identifies human or non-human face in digital images or video frames.

As used herein like characters refer to like elements.

Many video clips viewers such as cartoon fans imagine themselves being part of a funny or cool video clip or cartoon. For example an animated cartoon fan of Bugs Bunny cartoons may wish to create his own video presenting video sequences of the client's recording presenting himself eating a carrot concatenated with the well-known downloaded cartoon clip of Bugs Bunny eating a carrot and sharing the new mixed clip in popular web sites. Recording studios enable fans and clients to implement those combined recordings but at a high cost in terms of time, money and effort.

Media recording hardware and software in personal computers and mobile devices such as smart phones and home entertainment consoles allow users to record and edit their own videos (e.g. selfie), which they can then upload to their own mobile device or to popular Web sites, such as YouTube® and Facebook®. Additionally, computing capabilities in mobile devices for interacting with network servers allow mobile users to download any selected existing video source such as cartoons, video clips etc. Mixing together videos from different sources, typically from different formats however, remains a challenge and sometimes beyond the capabilities of most users and the equipment at their disposal.

Specifically, in respect to concatenating video sequences and/or video sources, one of the most popular image formats used today for delivering dynamic graphic content in the Web with minimum file size and download time are GIF (Graphic Interface Format) and MP4 other video formats that are less commonly used are for example VP8, m4v, mov, avi, fav, mpg, wmv, h265 etc.

GIF includes a bitmap image format which supports up to 8 bits per pixels for each image, allowing a single image to reference its own palette of up to 256 different colors chosen from the 24-bit RGB color space. It also supports animations and allows a separate palette of up to 256 colors for each frame. Typically, GIF is well-suited for simpler images such as graphics or logos with solid areas of color. Animated GIF which is an extension of the GIF standard, is a quick-and-easy way to present dynamic content, such as videos, especially in Web pages allowing animated images to be created by cramming a set of frames into a single file for sequential playback. These advantages have made GIF to be one of the common formats used for sharing images or video clips in social media, and naturally there is a growing need for editing, mixing or concatenating together two or more video GIFs, or a two different video formats such as a client's video clip recording with an existing image or video clip (e.g. GIF video).

The prior art solutions that are currently used today for concatenating two videos, includes manually processing and editing two videos. The resulted manually mixed video eventually doesn't look coherent and the video frames are not synchronized and compatible. Moreover, in many cases the frame rate and/or frame resolution and/or bit rate of a first video differ from the frame rate and/or frame resolution and/or bit rate of a second video, therefore these two videos won't match perfectly within a predefined timeline, thus combining the first and second video manually, for example with conventional editing tools is difficult and time-intensive. For example, in many cases, because of the differences between the combined video frame rates, there may be one or more fame shifts on the mixed video caused by the limitations of mixed-frame-rate editing. This is specifically common in respect to mixing GIF with a client's recording video sequence, since GIF is a low resolution and low frame rate format while a client's recording is typically recorded in high resolution and high rate format.

In light of the above, an improved editing and mixing of video sequences that overcomes at least some of the above mentioned deficiencies of the prior editing and mixing methods would be beneficial. Ideally such methods would be simple and convenient to operate, user friendly and the resulted video mixing should be seamless and coherent.

Embodiments that are described hereinbelow address this unmet need by enabling users to mix (e.g. concatenate) and synchronize one or more media asset sources such as an existing media asset (e.g. videos, movies or cartoons) with user media recordings in a simple and automatic manner. The user's media recordings may include one or more user's images or video. Alternatively, the user recording may comprise any suitable sort of media content, such as a selfie recording.

In the disclosed embodiments, the systems devices or methods are configured to receive via the network or client device one or more user media recordings wherein each user media recording comprises a video (e.g. client video) and optionally also a source audio data. The user may record the video, such as a selfie, on his device or other device and upload his recording to the server or to his device. Following the upload, or prior to the upload or during the upload (e.g. in real-time) the user may select one or more media asset sources presented for example on the user interface menu or on a web site which he wishes to mix with his recording. At the next step, the server or the user device automatically process the user media recording and/or the media asset source to match the dimension (e.g. size, rate, color etc.) of one another. At the following step the processed user media recording or the media asset source are grouped together, for example by concatenating the media asset or selected media asset sequences with the user recording to generate one or more composed media assets (e.g. mixed media assets) which are coherently and seamlessly interconnected and look naturally, logically and homogeneously connected and further display the mixed media assets at the user's device display. Finally, the user may share the one or more mixed media assets via the network to other client devices by for example one or more social mobile video platforms. According to one embodiment, the processing step includes parsing the client video recorded for example by the user and the source video, respectively, to a plurality of client video frames and a plurality of source video frames; identifying at least one face in at least one frame of the plurality of source video frames and at least another face in at least one frame of the plurality of client video frames by face detection; superposing one or more markers on the identified at least one face of the plurality of source video frames; processing said client video frames to fit the size or shape of said source video frames by using said one or more markers; concatenating said processed client video frames with said source video frames, wherein said concatenation comprises matching the frame rate and resolution of the processed client video frames to the frame rate and resolution of the plurality of client video frames to yield a mixed media asset.

FIG. 1 is a schematic diagram of a mixed media asset creation and a distribution system 100, in accordance with embodiments. A media server 22 comprises a processor 24 and a memory 26, which may store a plurality of media assets. Memory 26 also stores plurality of personal recording of different users such as media recording that processor 24 has received from user clients. Typically, server 22 comprises a suitable general-purpose computer (or a cluster of such computers), which has been programmed in software to carry out the functions that are described herein. This software may be downloaded to the computer in electronic form, over a network, for example. Additionally or alternatively, the software may be stored on tangible, non-transitory computer-readable media, such as magnetic, optical, or electronic memory media.

Server 22 communicates over a network 28 with multiple client devices 30, 32, 34. Typically, network 28 comprises the public Internet, and server 22 communicates with the client devices via a suitable Web interface, as is known in the art. Alternatively, the server and clients may communicate using any other suitable sort of network and interfaces.

Client devices 30, 32, 34 may comprise, for example, desktop, laptop, or tablet computers, media consoles, personal digital assistants or smart phones, or any other sort of device with the types of network, video and audio interfaces and computing capabilities needed to interact with server 22. By way of example, client device 30 comprises a computer with a processor 36, memory, video display 38 and speakers 40 for playing media assets, along with a video camera 42 and microphone 44 for recording. Client devices 32 and 34 are similarly equipped, though in different configurations.

In operation, users 46, 48 and 50 may record their media recordings for example on their devices 30, 32 and 34 and in some cases store their recording respectively on their devices 30, 32 and 34, for example on their devices storing means such as memory. Alternatively or in combination the users 46, 48 and 50 may upload the respective users' recordings via the network to server 22, for example, in accordance with embodiments processor 24 is configured to store the users' recordings in memory 26. Users 46, 48 and 50 may select one of the media assets (e.g. source media asset) stored, for example on memory 26 or on devices 36, 32, 34 (e.g. devices 30, 32 and 34 storing means such as memory) and request server 22 or their devices 30, 32 and 34, for example by the devices 30, 32 and 34 respective processor to play and mix (e.g. concatenate) the selected asset mixed with any of the users' recordings. As will be further illustrated in details below in respect to FIGS. 2-4, processor 24 or other processor, such devices 36, 32, 34 respective processors, are configured to detect one or more image assets such as face images within the client media recording and/or source media asset and automatically edit the selected image assets so both the user media recording and media source will be compatible. In accordance with embodiments, the processors may further group the selected asset and edited user media recording (e.g. concatenating sequences of video frames from both media source and the processed client media recording) generating a mixed media asset. Once the composition process is finalized, users 46, 48 and 50 may download the mixed media asset from server 22 and play it on their respective client devices 30, 32 and 34 and/or send or share it via the network to a friend.

Figure 2:
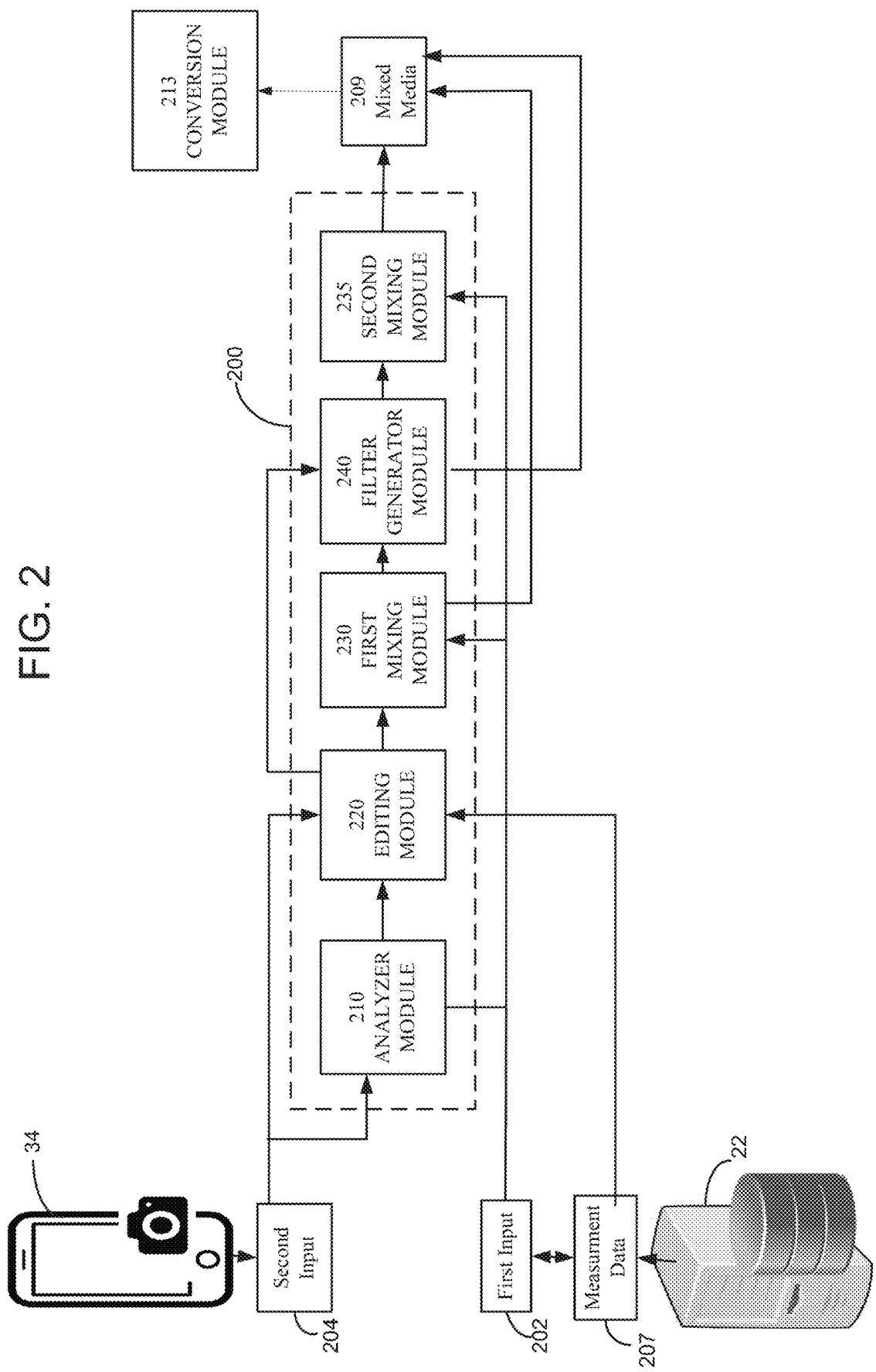
FIG. 2 shows a block diagram of an automatic real-time video creator module, in accordance with embodiments.

FIG. 2 shows a block diagram of an automatic real-time video creator module 200, in accordance with embodiments. Specifically, in accordance with embodiments, the video creator module 200 is configured to receive a first input 202 such as an existing media asset source (e.g. comprising one or more source videos in the form of GIF, MP4 etc.), selected for example from a source video gallery and a second input 204 including for example a user recorded video (e.g. client video) and process the two received inputs to generate a mixed media asset comprising, for example a seamless, coherent, synchronized format of the two received inputs. In some cases, the video creator module 200 may be executable by one or more processors such as the processor 36 of client device 30, or processor of client devices 32 and 34 or processor 24 as illustrated in FIG. 1.

According to some embodiments, the video creator module 200 may include an analyzer module 210, an editing module 220, one or more mixing modules, such as a first mixing module 230 and a second mixing module 235, and a filter generator module 240, which may be in communication with one another in accordance with embodiments.

The analyzer module 210 is configured to receive, for example in real-time, the first input including for example the existing media asset source 202 (e.g. a video in the form of for example GIF or MP4), downloaded for example from the server 22, and the second input including user recorded video 204 (e.g. client video), as recorded by imaging means for example at the user's 50 mobile device 34 and process each of the received videos, for example concurrently, to detect the position of one or more face images or face elements at each of the received videos (e.g. a face image in the first input and another face image in the second input). In some cases, the detection is performed using any appropriate detection methods, such as face detection algorithms, non-limiting examples of such algorithms include:

SMQT Features and SNOW Classifier Method (SFSC)
Efficient and Rank Deficient Face Detection Method (ERDFD)
Gabor-Feature Extraction and Neural Network Method (GFENN)
An efficient face candidates selector Features Method (EFCSF)

Specifically, the face detection process includes detecting at each of the received videos (e.g. the existing media asset source 202 and/or user recorded video 204) one or more face images, for example a single face image, and marking by one or more markers (e.g. face markers) the detected face images. In some embodiments, the existing media source 202 may be a video GIF and the markers are superposed on the detected face image of the video GIF, for marking the position and location (e.g. coordinates) of the face image at the GIF video. In some embodiments, the markers may indicate the location of face elements such left eye position, and/or right eye position and/or mouth position for each detected face image.

The editing module 220 is configured to receive from the analyzer module 210 data including info on the position and location (e.g. coordinates) of the detected face images or face elements and the second input comprising the client recording video. In some cases, the data may include the one or more respective markers (e.g. face markers) indicating the position of the face images or face elements. According to some embodiments the editing module 220 is further configured to receive measurement data 207, of the existing media source 202 for example from the server 22. The measurement data 207 may include information such as the media asset source 202 characteristics and measurements (e.g. as size and frame rate). Based on the received data measurement 207 and respective markers, the received user recorded video 204 is edited. Specifically, the editing process includes resizing and/or cropping and/or scaling one or more elements in the user recorded video 204 such as the detected face images or face elements in the user's video recording, according to the position of the received face markers of the first video input (e.g. GIF) so the detected face images or face elements in the client recorded video 204 such as eyes and/or mouth position will match the position and/or size of face images or features (e.g. eyes and/or mouth) of the existing media source 202 (e.g. video GIF).

In accordance with embodiments, the editing module 220 and the analyzer module 210 are configured to analyze and edit, for example simultaneously, the first input including for example the existing media asset source 202 (e.g. a client video in the form of for example GIF or MP4), and the second input including user recording video 204 by analyzing successively each of the frames of the first input and the second input to identify one of more faces at the first and second inputs, and editing the identified face at each frame of the second input according to the location of the identified face at each of the related preceding frame.

The first mixing module 230 is configured to receive and concatenate the edited client recorded video 204 or video sequences from the edited client recorded video 204 and the existing media source 202 (e.g. video GIF) and yield a new concatenated video (e.g. mixed media asset).

The first mixing module is further configured to match the frame rate and/or resolution and/or bit rate of the edited client recorded video 204 to the existing media source 202 (e.g. video GIF) frame rate and/or resolution and/or bit rate. As typically the existing media source 202 (e.g. video GIF) frame rate and/or resolution and/or bit rate are lower than the client recorded video frame rate and/or resolution and/or bit rate, the first mixing module 230 will, in some cases, decrease the frame rate and/or resolution and/or bit rate of the video with the higher rates (e.g. the client video recording) to match the frame rate and/or resolution and/or bit rate of the video with the lower rates (e.g. the existing media source-video GIF).

According to some embodiments, the new formed concatenated video (e.g. mixed media 209), as mixed at the first mixing module 230 may be transmitted, for example directly, to a conversion module 213 for converting and packing the concatenated video as an MP4 or GIF video and further uploaded and share it by the user on social media sources.

The filter generator module 240 is configured to receive the edited user recorded video 204 from the first mixing module 230 or from the editing module 220 and perform one or more filtering procedures on the edited video, for example automatically or according to the use's pre-selected filtering options, to enhance the mixed video viewing experience.

According to some embodiments the new formed concatenated and filtered video (e.g. mixed media 209), as mixed at the first mixing module 230 and filtered at the filter generator module 240 may be transmitted, for example directly, to a conversion module 213 for converting and packing the concatenated video as an MP4 or GIF video and may be uploaded and shared by the user on social media sources.

According to some embodiments, the filter generator module 240 may activate one or more of the following filtering options, for example according to the user filtering selection:
 a. Fast forward: enhance frame rate. For example, for an X frame rate video show Y frames per second (where Y>X).
 b. Slow motion: decrease frame rate. For example, for an X frame rate video show Y frames per second (where Y<X).
 c. Enhance color-change Luma layer (Y) in order to eliminate brightness and create an enhanced color contrast between different color in each frame.
 d. Black and White: use only Luma layer (Y) and show only gray scaled video.
 e. Natural filter-find the average Chroma of the first input (e.g. GIF) and create a color filter to be used over the second input (e.g. client video recording) to yield a better and natural seamless mixed video.

The second mixing module 235 is configured to receive from the filter generator module 240 the edited and filtered client recorded video 204 and the existing media source 202, for example from the server 22, and concatenate the received videos to yield a new filtered concatenated video (e.g. mixed media asset 209). In some cases, the new formed filtered and concatenated video may be converted and packed by conversion module 213 as an MP4 or GIF video and may be uploaded and shared by the user on social media sources.

FIG. 3A shows a flowchart of a method 300 for concatenating a first video (e.g. at least one existing media source 202) with a second video (e.g. at least one user or client recorded video 204) using face detection means or methods to form a new coherent, seamless and synchronized video (e.g. mixed media asset 209), in accordance with embodiments. At step 310 a first video source (e.g. existing media source 202) is selected from a video library based on a user operation. Typically, the user of a client device, such as client device 34 chooses the source media video from a menu or video library, of available selections on a Web site maintained by the server 22. In some cases, the library includes a number of video clips in the form of video GIFs or MP4 videos. For example, as illustrated in FIG. 3B the first selected video source may be an original video GIF 302 including an image of a person 303. At step 315 the selected first videos is parsed to a number of frames for example by the analyzer module 210. At step 320 a user records his own recording (e.g. second video-user's recorded video 204), for example by a digital camera or a device such as the client device 34 embedded camera. Alternatively, the second video may be selected by a user from a menu of available selections on a Web site maintained by the server or from a video sources stored at the user device. For example, as illustrated in FIG. 3B the second video may be a user recorded video 304 including an image, for example of a second user 305. In accordance with embodiments, the first video source comprises video data or objects which are different from the second selected video. Additionally, in some cases, the resolution and frame rate of the first video and second video differ from one another. For example, the first selected video may be an animated GIF video or MP4 video of a person or an animal having a resolution and frame rate of SD with about 15 FPS while the second video may be a high resolution user selfie video having a resolution and frame rate of HD with about 60 FPS.

At step 325 the second video is parsed to a number of frames for example by the analyzer module. At step 330 one or more face images or face elements such as eyes (e.g. left and right) and/or nose and/or mouth are identified in the first video and second video using for examples face detection means or methods as known in the art and as described herein (e.g. SMQT, SFSC, ERDFD, GFENN, EFCS). At step 335 one or more markers are superposed on the one or more identified face images or face elements to mark the location and/or position of the identified one or more face images or face elements. At step 340 the face position markers 306 are extracted from the first video and superposed on the identified face images of one or more frames of the second video. For example, as illustrated in FIG. 3B, the analyzer module 210 is configured to identify a face 303' of person 303 in the GIF video 302 and accordingly a number of 'plus' shaped markers (e.g. six markers) 306 are superposed on the person's eyes, nose and mouth. Then, the markers 306 are extracted from the first video frame 302 and superposed on the identified second user 305 face image 305'.

At step 345 the second video frames are processed, according to the location of the extracted markers 306 in the second video frames, to yield an edited second video which match the size of the first video, e.g. having elements, such as a face image or other elements which suit the size and shape of elements of the first video. Specifically, the processing includes resizing and/or cropping and/or scaling the second video frames, based on the location of the markers 306 on the second video frames (e.g. video frames of the first video preceding the frames of the second video), to match and/or suit the size and shape of the first video frame. More specifically, the processing includes resizing and/or cropping and/or scaling each of the second video frames, or substantially all frames of the second frames according to the location of the markers 306 as extracted from preceding frames of the first video (e.g. source video). For example as illustrated in FIG. 3B a frame of the first source video 302 precedes in time frame of the second video 304. Accordingly, the second user 305 is resized and cropped, for example in real-time, based on the location of extracted markers 306 to yield a resized and cropped video 309 which match partially or completely the size and shape of image of person 303 of the first source video 302. Specifically, as illustrated in FIG. 3B the size of the original user recorded video 304 is reduced to the size of the source video 302.

At step 350 the first video and the edited second video frames are grouped together (e.g. concatenated) for example by concatenating the first and second videos to yield a new video (e.g. mixed video asset) comprising the concatenated video frames which match the size, shape and rate of one another.

Specifically, the grouping (e.g. concatenating) includes matching the frame rate and/or resolution and/or bit rate of the edited client recorded video 204 to existing media source 202 (e.g. video GIF) frame rate and/or resolution and/or bit rate to yield a new coherent, seamless and synchronized video. As typically the existing media source 202 (e.g. video GIF) frame rate and/or resolution and/or bit rate are lower than the client recorded video frame rate and/or resolution and/or bit rate, the first mixing module 230 will, in some cases, decrease the frame rate and/or resolution and/or bit rate of the video with the higher rates (e.g. the user recording) to match the frame rate and/or resolution and/or bit rate of the video with the lower rates (e.g. the existing media source-video GIF).

Figure 3C:
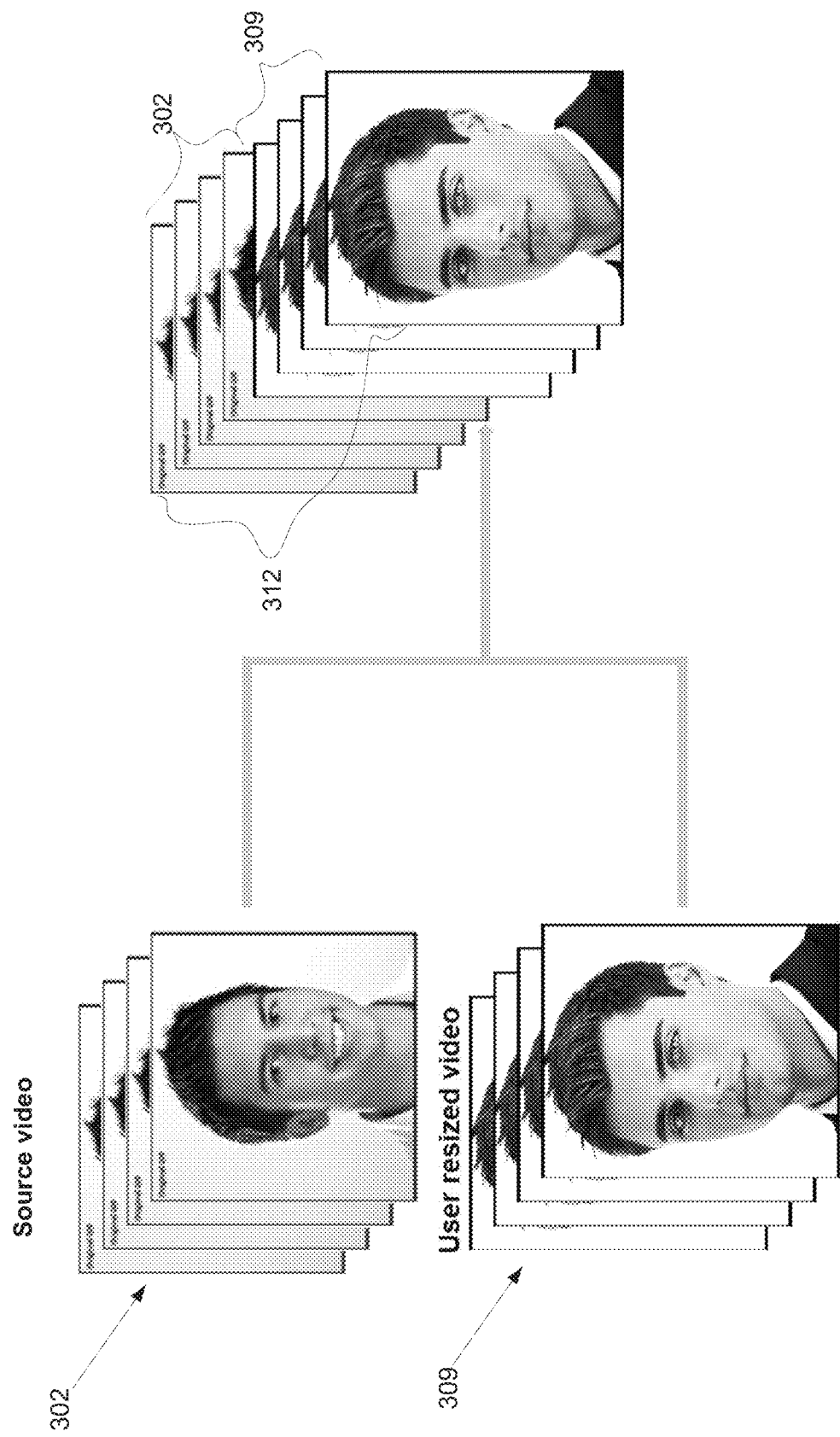

For example, as illustrated in FIG. 3C, the original first video 302 frames (e.g. original GIF frames 302(*i*), 302(*ii*) . . . 302(*x*)) are concatenated with the edited second video frames 309 (e.g. user resized video frames 309(*i*), 309(*ii*) . . . 309(*x*)) creating a new coherent and seamless video 312. In some cases, as illustrated in FIG. 3C the frames 309 of the edited second video may be concatenated following the first video frames 302. In some cases, the first video frames 302 may be concatenated following the frames 309 of the edited second video.

According to some embodiments, at step 355 the new concatenated video is filtered, by for example the filter generator module 240, according to a pre-selected, or automatically activated filtering process. The filtering process may include one or more of the following filtering actions:

- Enhance/reduce the frame rate by fast forward/slow motion filtering;
- Change one or more frames color to eliminate brightness and create an enhanced between different colors of the frame;
- Change one or more frames resolution. In some embodiments, the resolution which is changed is the resolution of the video which includes the higher resolution in respect to the other video. For example the detected high resolution of the video is decreased to match the low resolution using for example downsampling methods.
- Change video or frames bit rate. In some embodiments, the video with the higher frame rate/bit rate is being decreased to match the lower frame rate/bit rate of the other video by deleting one or more frames, as illustrated in FIG. 3D.

For example, as illustrated in FIG. 3D the edited second video 309 (e.g. including for example 12 frames) on timeline 311 are 'fast forward' filtered yielding a sequence of dense video frames 313 (e.g. including 16 frames/t). Alternatively, the edited second frames 309 on time line 311 may 'slow motion' filtered yielding a sequence of slow rate frames (e.g. 6 frames/t).

In some cases, at step 360 the filtered and concatenated frames are converted, for example automatically to a selected format such as GIF or MP4 format or other formats such as VP8, m4v, mov, avi, fav, mpg, wmv, h265.

In some cases, the concatenated frames are not filtered and the new video may be directly converted to one of the selected formats.

At step 365 the video (e.g. converted video) may be displayed for example on the user's device display and/or shared manually or automatically at a selected web site.

Alternatively or in combination, the processing of the second video (e.g. the client video recording) may include, in accordance with embodiments, positioning the first video (e.g. source video) in a partly transparent configuration on the second video to enable the user to move his face, for example in real-time, while recording himself, and place it on the face of the displayed first video.

Alternatively or in combination, the processing of the second video (e.g. the client video recording) may include, in accordance with embodiments, superposing one or more markers of the first video, indicating the location of a face of the first video, on the second video, to direct the user, for example in real-time, where to position his face, so the position of the user face in the second video will match the position of the face in the first video. Accordingly, once the face location in the frames in the first and second video are matched, the frames of the first video may be cropped and/or resized accordingly having a synchronized ratio.

FIG. 4 is a schematic representation of a user interface screen 410 that is transmitted from server 22 to client devices 30, 32, 34, in accordance with an embodiment. Server 22 automatically adjusts the screen to the type of client device and the software that it is running. For example, different screen versions may be provided for tablets and other mobile devices, as well as for integration in social networking applications, such as Facebook®.

Screen 410 allows users to select different functions in order to create and/or play a mixed media asset. For example, according to some embodiments, the screen 410 may present a "video source library" window 420 which includes a number of icons or frames 422, relating to a number of different video sources (e.g. ten or more) for example in the form of GIF which the client device user may choose. When a user selects one of these frames, he or she is prompted to create and upload a corresponding media recording by choosing 'record your part' option 430. In some cases, the selected GIF is presented to the user at the upper side of the screen while 'real time' video recording 440 is displayed to the user so he can imitate the selected GIF. For example as illustrated in FIG. 4 the user selected a GIF video 424 presenting a cat playing a piano, and accordingly the user is prompted to imitate the cat's movements to provide the concatenated video, including the cat GIF video mixed with the user's recording which may be presented in real-time on screen 460. In some cases, the screen 460 may include icons 462 of social mobile video platforms, sharing and live-streaming options including for example Gmail, YouTube, and social media sites such as Facebook so the user can share the mixed media asset in real time or close to real-time.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for media processing, comprising:
providing at least one media asset source selected from a media asset sources library, the at least one media asset source comprising at least one source video, via a network or client device, wherein the at least one source video comprises a plurality of source video frames;
receiving via the network or the client device a media recording comprising a client video recorded by a user of the client device, wherein the client video comprises a plurality of client video frames and wherein the frame rate and bit rate of the at least one source video is different from the frame rate and bit rate of the client video;
parsing the client video and the source video, respectively, to the plurality of client video frames and the plurality of source video frames;
identifying at least one face image in at least one frame of the plurality of source video frames and at least other face image in at least one frame of the plurality of client video frames using a face detection method;
superposing one or more markers on the identified at least one face image in the at least one frame of the plurality of source video frames;
processing said client video frames and said source video frames using an editing module and an analyzer module to fit the size or shape of elements in said client video frames to the size or shape of elements in said source video frames;
mixing said processed client video frames with said source video frames, using a mixing module, to yield a mixed media asset;
filtering the new mixed media asset using a filter generator module, wherein said filtering comprises:
matching the frame rate, the bit rate and resolution of the processed client video frames to the frame rate, bit rate and resolution of the plurality of client video frames; and grouping the processed client video frames of the plurality of client video frames to yield a mixed and coherent media asset.

2. The method of claim 1, wherein said processing comprises:
extracting said one or more markers from said at least identified one face image and superposing the extracted one or more markers on the other at least one identified face; and
resizing the other at least one identified face to match the size or shape of the at least one identified face in the at least one frame of the plurality of source video frames.

3. The method of claim 2, wherein said processing further comprises cropping or scaling the at least one other identified face image in the at least one frame of the plurality of client video frames to match the size or shape of said identified at least one face image in the source video frames.

4. The method of claim 1, wherein said filtering comprises one or more of the following filtering procedures:
fast forward filtering; slow motion filtering; color filtering; black and white filtering.

5. The method of claim 1, wherein said face detection method comprise identifying the position of one or more face elements in at least one frame of the plurality of video source frames and other one or more face elements in the at least one client video frames.

6. The method of claim 1, wherein said media asset source is in a form selected from the group consisting of:
graphics interchange format (GIF); or MP4; VP8; m4v; mov; avi; fav; mpg; wmv; h265, and the client video form is in a different form.

7. The method of claim 1, wherein said face detection are selected from a face detection algorithms group consisting of:
SMQT Features and SNOW Classifier Method (SFSC),
Efficient and Rank Deficient Face Detection Method (ERDFD),
Gabor-Feature Extraction and Neural Network Method (GFENN),
an efficient face candidates selector Features Method (EFCSF).

8. An apparatus for media processing, comprising:
a memory which is configured to hold one or more source media videos, wherein each of the one or more source media videos comprises a plurality of source video frames; and
a processor which is configured to:
transmit the one or more source media videos to a client device;
receive, via the network or the client device, a media recording comprising a client video recorded by a user of the client device, wherein the client video comprises a plurality of client video frames and wherein the frame rate and bit rate of the one or more source media videos is different from the frame rate and bit rate of the client video;
parse the client video and the source video, respectively, to the plurality of client video frames and the plurality of source video frames;
identify at least one face image in at least one frame of the plurality of source video frames and at least other face in at least one frame of the plurality of client video frames using face detection method;
superpose one or more markers on the identified at least one face image in the at least one frame of the plurality of source video frames;
process said client video frames and said source video frames using an editing module and an analyzer module to fit the size or shape of elements in said client video frames to the size or shape of elements in said source video frames;
mix said processed client video frames with said source video frames, using a mixing module, to yield a new mixed media asset; and
filter the new mixed media asset, wherein said filtering comprises:
matching the frame rate, the bit rate and the resolution of the processed client video frames to the frame rate, bit rate and the resolution of the plurality of client video frames; and
grouping the processed client video frames of the plurality of client video frames to generate a mixed and coherent media asset.

9. The apparatus of claim 8, wherein said processing comprises:
extracting said one or more markers from said identified at least one face image and superposing the extracted one or more markers on the other at least one identified face; and
resizing the other at least one identified face to match the size and shape of the at least one identified face in the at least one frame of the plurality of source video frames.

10. The apparatus of claim 8, wherein said processing further comprises cropping or scaling the at least one other identified face image in the at least one frame of the plurality of client video frames to match the size or shape of said identified at least one face image in the source video frames.

11. A computer software product, comprising a non-transitory computer-readable medium in which program instructions are stored, which instructions, when read by a computer, cause the computer to provide at least one media asset source selected from a media asset sources library, the at least one media asset source comprising at least one source video, via a network to a client device, wherein the at least one source video comprises a plurality of source video frames;
receive via the network from the client device a media recording comprising a client video recorded by a user of the client device, wherein the client video comprises a plurality of client video frames and wherein the frame rate and bit rate of the one or more source media videos is different from the frame rate and bit rate of the client video;
parse the client video and the source video, respectively, to the plurality of client video frames and the plurality of source video frames;
identify at least one face image in at least one frame of the plurality of source video frames and at least other face in at least one frame of the plurality of client video frames using face detection method;
superpose one or more markers on the identified at least one face image in the at least one frame of the plurality of source video frames;
simultaneously process and edit said client video frames and said source video frames using an editing module and an analyzer module to fit the size or shape of elements in said client video frames to the size or shape of elements in said source video frames, said processing and editing comprises:
extracting said one or more markers from said identified at least one face image in the at least one frame of the plurality of source video frames; superposing the extracted one or more markers on the at least other face image; and
resizing the at least other face image to match the size or shape of the identified at least one face image, using the superposed one or more markers;
mix said processed client video frames with said source video frames, using a mixing module, to yield a new mixed media asset;
filter the new mixed media asset, wherein said filtering comprises:
matching the frame rate, the bit rate and the resolution of the processed client video frames to the frame rate, the bit rate and the resolution of the plurality of client video frames; and grouping the processed client video frames of the plurality of client video frames to generate a mixed and coherent media asset.

12. The method of claim 1, comprising analyzing and editing simultaneously said client video frames and said source video frames using the editing module and the analyzer module to fit the size or shape of elements in said client video frames to the size or shape of elements in said source video frames, by analyzing successively each of the frames of said client video frames and said source video frames to identify one of more faces at said client video frames and said source video frames, and editing the identified face at each frame of said client video frames according to the location of the identified face at each of the related preceding frame.

13. The apparatus of claim 8, wherein the editing module and the analyzer module are configured to simultaneously fit the size or shape of elements in said client video frames to the size or shape of elements in said source video frames by analyzing successively each of the frames of said client video frames and said source video frames to identify one of more faces at said client video frames and said source video frames, and editing the identified face at each frame of said client video frames according to the location of the identified face at each of the related preceding frame.

* * * * *